Patented July 20, 1937

2,087,468

UNITED STATES PATENT OFFICE 2,087,468

POLYMERIZATION PRODUCTS AND PROCESS OF MAKING SAME

William Chalmers, Vancouver, British Columbia, Canada, assignor, by mesne assignments, to Röhm & Haas Company, Philadelphia, Pa.

No Drawing. Continuation of application Serial No. 431,982, February 27, 1930. This application September 19, 1935, Serial No. 41,257. In Canada January 29, 1930

18 Claims. (Cl. 260—2)

This invention relates to the preparation of polymerization products of derivatives of methacrylic acid such as methacrylic ethyl ester and methacrylic nitrile.

Substances produced by polymerization of methacrylic ethyl ester and methacrylic nitrile may be used as artificial resins, transparent or glass-like resins, or as plastic materials.

The polymerization products of methacrylic ethyl ester are obtained by exposing the methacrylic ethyl ester to the action of heat, sunlight, or ultra-violet light, with or without the use of catalysts, such as sodium, potassium, benzoyl peroxide or other organic or inorganic peroxides. The ester may be in the pure state or in solution in solvents such as benzene.

While the polymerization may be completed by allowing the ester to stand in the dark in a warm place for several weeks, it is preferred to subject the ester to the action of the agents above mentioned in order to accelerate the rate of polymerization so that the polymerization products may be produced on a commercial scale.

The nature of the product resulting from polymerization of methacrylic ester varies from that of an elastic solid to a hard glassy substance, dependent upon the duration or completeness of the polymerization process. The elastic substance thus obtained may be converted into the hard glassy form by distilling off the unchanged monomer at 130° C.

Both forms of the polymerization product thus obtained are soluble in all common organic solvents, except the alcohols in which they are only partially soluble. Solution of the polymer is rather slow and swelling first takes place followed by solution of the swollen mass. The elastic substance or product obtained is simply the glassy form which has been swollen by means of the unchanged monomer and, because of this previous swelling, is more quickly soluble in organic solvents.

These polymerized substances, when allowed to evaporate on a glass, metal or wood surface, form a smooth glassy coating of great durability and are thus particularly suited as a base for lacquers.

The methacrylic nitrile may be polymerized by the application of heat or by allowing the nitrile to stand with alkali metals such as those referred to in connection with the polymerization of the methacrylic ethyl ester.

The monomeric ester or nitrile may be hydrolyzed before polymerization by means of dilute acids or alkalies to give the methacrylic acid which is already known to polymerize to a porcelain-like mass.

In order to more clearly illustrate the manner in which the polymerization process above described may be carried out, the following examples are given:—

Example 1

Methacrylic ethyl ester, to which about one-half of one per cent of benzoyl peroxide has been added, is placed in a suitable quartz or other container and exposed to the radiation from a mercury vapor lamp. The rate of polymerization depends, of course, upon temperature conditions and upon the intensity of the radiation. It has been found that when a small sample of the ester and peroxide is placed in close proximity to a small 110 volt lamp the ester is converted into a glassy solid material in a period of time ranging from one and one-quarter to one and one-half hours.

Example 2

The methacrylic ethyl ester may be heated in a closed container for sixteen to twenty hours at 130° C. at the end of which time it is converted into the solid polymer. This solid may be dissolved in all of the common organic solvents except the alcohols in which it is only partially soluble.

Example 3

Methacrylic nitrile is treated by placing therein one per cent of sodium wire and allowing the nitrile to stand for a week, at the end of which time it is entirely converted into a solid resinous mass of a dark brown color. The sodium is destroyed and the dark color removed by the addition of alcohol. The purification may then be completed by washing with water so that the final product is a light colored resinous material.

Example 4

Polymethacrylic nitrile is dissolved in concentrated hydrochloric acid in which it forms a clear solution. The solution is then diluted with water so that the polymethacrylic acid is precipitated as a white flocky mass which can be filtered and dried.

While in the foregoing description reference has been made solely to the polymerization of methacrylic ethyl ester, it will be understood that the process may also be applied to the polymerization of butyl ester and other homologues.

It may be pointed out that the polymerized nitrile can be utilized as a plastic material for various purposes.

This application is a continuation of my copending application Serial No. 431,982, filed February 27, 1930.

I claim:

1. A composition of matter comprising a polymer of the butyl ester of α-methacrylic acid.

2. A composition of matter comprising polymeric butyl-α-methacrylate.

3. A composition of matter comprising a polymer of the nitrile of α-methacrylic acid.

4. A composition of matter comprising polymeric α-methacrylic nitrile.

5. The process of preparing polymerized butyl-α-methacrylate which comprises subjecting butyl-α-methacrylate to polymerizing influences in the presence of an oxygen-yielding substance.

6. The process of preparing polymerized butyl-α-methacrylate which comprises subjecting butyl-α-methacrylate to polymerizing influences in the presence of an organic peroxide.

7. The process of preparing polymerized butyl-α-methacrylate which comprises heating butyl-α-methacrylate in the presence of benzoyl peroxide.

8. The process of preparing polymerized α-methacrylic nitrile which comprises subjecting α-methacrylic nitrile to polymerizing influences in the presence of an oxygen-yielding substance.

9. The process of preparing polymerized α-methacrylic nitrile which comprises subjecting α-methacrylic nitrile to polymerizing influences in the presence of an organic peroxide.

10. The process of preparing polymerized α-methacrylic nitrile which comprises heating α-methacrylic nitrile in the presence of benzoyl peroxide.

11. The process of preparing polymerized ethyl α-methacrylate which comprises subjecting ethyl α-methacrylate to polymerizing influences in the presence of an oxygen yielding substance.

12. The process of preparing polymerized ethyl α-methacrylate which comprises subjecting ethyl α-methacrylate to polymerizing influences in the presence of an organic peroxide.

13. The process of preparing polymerized ethyl α-methacrylate which comprises heating ethyl α-methacrylate in the presence of benzoyl peroxide.

14. The process of polymerizing a member of the group consisting of the ester and nitrile derivatives of α-methacrylic acid, which comprises subjecting a member of said group to polymerizing influences in the presence of an oxygen yielding substance.

15. The process of polymerizing a member of the group consisting of the ester and nitrile derivatives of α-methacrylic acid, which comprises subjecting a member of said group to polymerizing influences in the presence of an organic peroxide.

16. The process of polymerizing an ester of α-methacrylic acid which comprises heating said ester in the presence of benzoyl peroxide.

17. A process which comprises polymerizing esters of methacrylic acid in the presence of one of the group consisting of organic and inorganic peroxides.

18. A new article of manufacture comprising polymerized methacrylic acid butyl ester.

WILLIAM CHALMERS.